July 13, 1926.  
R. A. BLUNCK  
1,592,131  
FLOAT AND INDICATOR MECHANISM  
Filed April 24, 1924
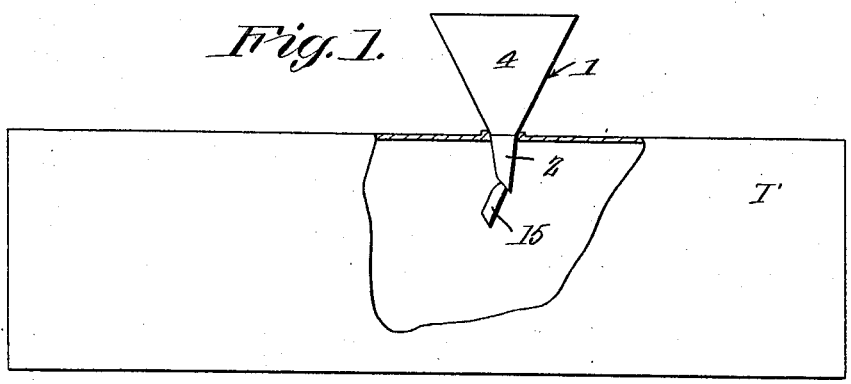
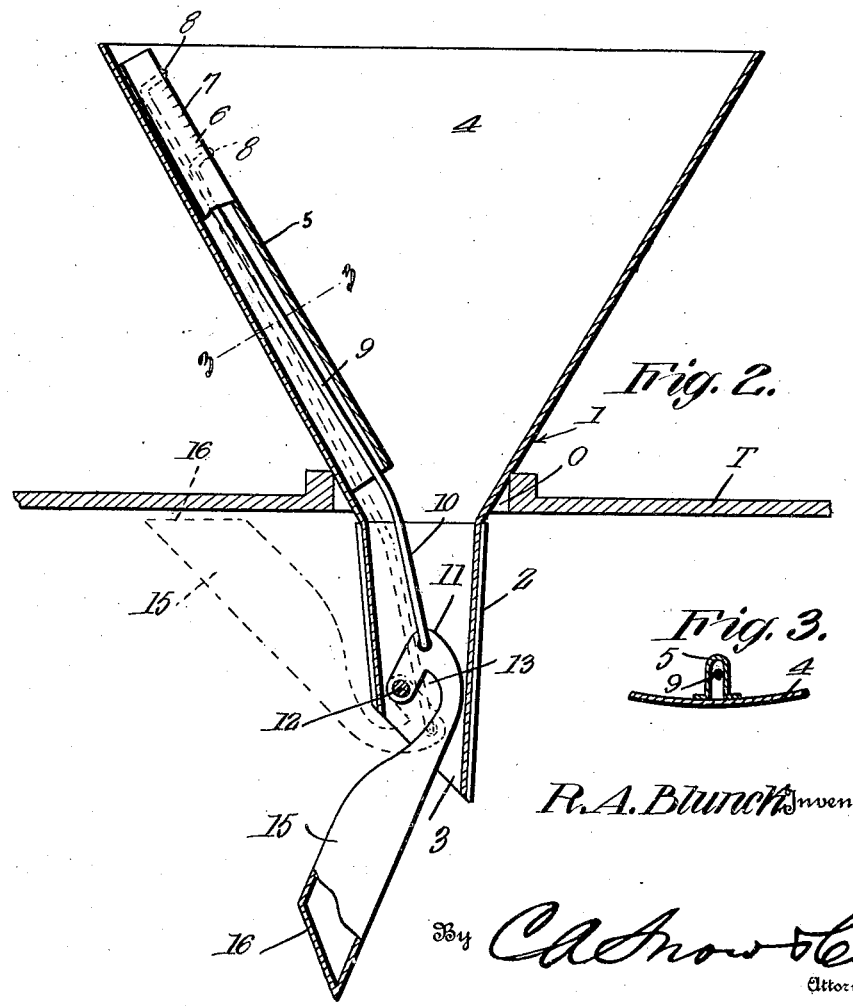
R. A. Blunck Inventor
By C. A. Snow & Co.
Attorneys Patented July 13, 1926.

1,592,131

UNITED STATES PATENT OFFICE.

ROBERT A. BLUNCK, OF GRAND MOUND, IOWA.

FLOAT AND INDICATOR MECHANISM.

Application filed April 24, 1924. Serial No. 708,823.

This invention relates to a combined float and indicator for disclosing the quantity of liquid contained in an opaque vessel.

The object of the invention is to provide an automatic device of this character so constructed that the quantity of liquid in the tank may be always seen thereby avoiding overflowing during the filling of the tank as well as preventing the supply from being depleted without the operators being aware thereof.

Another object of the invention is to provide a combined float and indicator of this character which may be used in connection with a funnel or remain permanently in a tank such as a gasoline tank of an automobile or the like.

With the foregoing and other objects in view which will appear as the description proceeds, the invention resides in the combination and arrangement of parts and in the details of construction hereinafter described and claimed, it being understood that changes in precise embodiment of the invention herein disclosed, may be made within the scope of what is claimed without departing from the spirit of the invention.

In the accompanying drawings:—

Figure 1 represents a side elevation of a tank having mounted therein a funnel equipped with this combined float and indicator, parts of the tank being broken out to illustrate the mounting of the funnel;

Fig. 2 is a central vertical section on an enlarged scale of the funnel and a vessel in connection with which it is to be used, the float being shown at its extreme lower limit in full lines and in raised position such as it assumes when the tank is full in dotted lines;

Fig. 3 is a transverse section taken on the line 3—3 of Fig. 2;

In the embodiment illustrated in Figs. 1 to 4 the combined float and indicator are shown mounted on a funnel 1 the tubular stem 2 of which has its lower end beveled as shown at 3 whereby 1 side wall is made shorter than the other for a purpose presently to be described. The body 4 of the funnel is equipped on its inner face with a tubular housing 5 extending from its upper toward its lower end and gradually increasing in size toward said lower end. This tubular guide 5 is preferably made substantially inverted U-shaped in cross section as shown in Fig. 3 and is soldered or otherwise secured to funnel 4. The upper portion of housing 5 is slotted longitudinally as shown at 6 for a purpose presently to be described. The outer wall of the slotted portion 6 of housing 5 is equipped with a scale 7 to cooperate with a movable float carried finger 8 to show the quantity of liquid contained in the vessel in connection with which the funnel is used.

The finger 8 extends laterally from the upper end of a rod 9 mounted to reciprocate in the housing 5 the lower end 10 of said rod being bent at an obtuse angle and engaged loosely with an elbow or goose neck 11 carried by a float 15. The rod end 10 is preferably hooked in an aperture in elbow 11. This elbow 11 has its free end fulcrumed at 12 in the side walls of the tubular stem 2 of the funnel at a point adjacent the upper portion of the inclined lower end 3 of said funnel so that when the float rises incident to the raising of the liquid level in the tank T the elbow 11 at the elbow joint will swing up around said funnel stem and permit the float to raise to the dotted line position shown in Fig. 2.

The float 15 is hollow and closed throughout it being here shown cylindrical in form with its lower end beveled as shown at 16 to adapt it to rise vertically in tank T and to swing close in to the funnel stem 2 as shown in dotted lines in Fig. 2.

In the use of this funnel with the combined float and indicator mounted therein the funnel is tilted at an angle of about 50° before it is inserted in the opening O of tank T so that the float will rest against the inner face of the longer end portion of the funnel stem or nozzle 2. When the float is in this position it will be in longitudinal alinement with the funnel stem or nozzle and may be inserted through the opening O. The funnel is then turned so that the indicator extends lengthwise of the tank to obtain the extreme range of the float. The thumb or fore finger is then placed on the finger 8 of the indicator and said indicator pressed downward. This gives the range of the float inside of tank T and which will be shown by the scale on the housing 5. The tank is now ready to be filled and as the liquid is poured in through the funnel the indicator will begin to register on the scale of the housing 5 until it reaches the point where the range was found which will indicate that the tank is full.

After the funnel is placed in the opening of the tank in a vertical position the nozzle of the funnel is cleared from the float as shown in Fig. 2 due to the setting of the fulcrum or pivot pin 12 from the center line of the float and also from the weight above pin 12 together with the weight of the indicator which is supported by the elbow 11 above pin 12. This construction permits the float to hang at one side of the funnel allowing nearly the full capacity of the nozzle of the funnel without obstructing it, the float 15 being positioned at an oblique angle to the nozzle so that the raising of the liquid level in the tank will operate to readily lift the float.

I claim:

In a device of the class described, a body portion having a tubular stem, the lower end of the stem being beveled, a tubular housing mounted within the body portion and having an elongated opening formed therein, and having graduations formed thereon adjacent to the opening, a float having a hook-shaped upper end pivoted at its beak within the stem adjacent to the shorter wall thereof, and at one side of its median line whereby the float may rise vertically with the hook-shaped portion extending around the edge of the shorter wall of the tubular member, a rod connected at one end with said hook-shaped end at a point spaced inwardly from its pivotal connection, and having its other end extending through the elongated opening of the tubular housing to cooperate with the graduations.

In testimony that I claim the foregoing as my own, I have hereto affixed my signature.

ROBERT A. BLUNCK.